(12) United States Patent
Nakano et al.

(10) Patent No.: US 8,716,405 B2
(45) Date of Patent: *May 6, 2014

(54) RESIN COMPOSITION, HEAT SEAL FILM AND LAYERED FILM

(75) Inventors: Shigenori Nakano, Ichihara (JP); Kaoru Suzuki, Ichihara (JP)

(73) Assignee: Du Pont-Mitsui Polychemicals Co. Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/700,521

(22) PCT Filed: May 27, 2011

(86) PCT No.: PCT/JP2011/062274
§ 371 (c)(1),
(2), (4) Date: Nov. 28, 2012

(87) PCT Pub. No.: WO2011/152324
PCT Pub. Date: Dec. 8, 2011

(65) Prior Publication Data
US 2013/0079457 A1    Mar. 28, 2013

(30) Foreign Application Priority Data

Jun. 2, 2010 (JP) .................. 2010-127129

(51) Int. Cl.
*C08F 8/00* (2006.01)
*C08L 33/02* (2006.01)
*C08L 23/06* (2006.01)
*C08L 23/10* (2006.01)

(52) U.S. Cl.
USPC ........................ 525/191; 525/221; 525/240

(58) Field of Classification Search
USPC ......................... 525/191, 221, 240
See application file for complete search history.

(56) References Cited

U.S. PATENT DOCUMENTS

| 4,870,128 A * | 9/1989 | Couturier et al. ............. 524/556 |
| 2008/0131715 A1 | 6/2008 | Dewa et al. |
| 2012/0108754 A1 * | 5/2012 | Nakano et al. ................ 525/221 |

FOREIGN PATENT DOCUMENTS

| JP | 57008234 | 1/1982 |
| JP | 58-215437 | 12/1983 |
| JP | 1-049382 | 10/1989 |
| JP | 5-011549 | 2/1993 |
| JP | 2002-200719 | 7/2002 |
| JP | 2006/068275 | 6/2006 |
| JP | 2007-520586 | 7/2007 |
| JP | 2008-500450 | 1/2008 |
| WO | 2006/068275 | 6/2006 |
| WO | 2009/145235 | 12/2009 |

OTHER PUBLICATIONS

International Search Report filed in PCT/JP2011/062274.
Office action in corresponding Japanese Application No. 2011-533035 mailed Oct. 25, 2011.

* cited by examiner

*Primary Examiner* — Nathan M Nutter
(74) *Attorney, Agent, or Firm* — Rankin, Hill & Clark LLP

(57) ABSTRACT

The present invention provides a resin composition including (1) at least one selected from the group consisting of ethylene-α,β-unsaturated carboxylic acid copolymers and ionomers thereof, which have a melt flow rate of from 0.5 g/10 min to 6 g/10 min, (2) at least one selected from the group consisting of ethylene-α,β-unsaturated carboxylic acid copolymers and ionomers thereof, which have a melt flow rate of from 10 g/10 min to 30 g/10 min, and (3) at least one selected from the group consisting of propylene homopolymers and copolymers obtained by copolymerization using propylene and one or more α-olefins excluding propylene, in which a structural unit derived from an α,β-unsaturated carboxylic acid ester is substantially not contained in the total amount of the ethylene-α,β-unsaturated carboxylic acid copolymers and the ionomers thereof.

11 Claims, 5 Drawing Sheets

RESIN COMPOSITION, HEAT SEAL FILM AND LAYERED FILM

TECHNICAL FIELD

The present invention relates to a resin composition suitable for heat sealing, a heat seal film, and a layered film.

BACKGROUND ART

Conventionally, a tubular or a flat film-shaped packaging material has been sealed by heat sealing (lock sealing) so as to protect the contents contained therein during storage, during transport, or the like. Regarding the improvement of the seal strength in the lock sealing, various investigations have been carried out into aspects such as the packaging material, the packaging machine, or the packaging conditions. As a polymer material used for the packaging material, for example, ethylene-based polymers such as polyethylene or an ethylene-vinyl acetate copolymer are known. Above all, an ionomer is widely used, since the ionomer is excellent in terms of a hot tack property, a low-temperature sealing property, oil resistance, and the like.

Further, a method of heat sealing (peelable sealing) has also been conducted, which makes it possible to protect the contents with a strong lock sealing property to a certain degree, and to open the package by peeling the sealed portion while applying force when it is desired to take the contents out of the packaging material.

For example, a polymer material including 80% by weight to 93% by weight of an ethylene/acid ionomer and 7% by weight to 20% by weight of a propylene/$\alpha$-olefin copolymer has been disclosed (see, for example, Japanese Patent Application Publication (JP-B) No. 1-49382). It is said that the lock sealing and the peelable sealing can be performed on a packaging material that uses the polymer material, depending on the temperature. When a film or a layered material is formed using the polymer material, and filled and packed using a packaging machine, by lock-sealing the backing or bottom part under a high temperature condition and peelable-sealing the top side under a low temperature condition, it is possible to perform packaging having both a lock seal portion and a peelable seal portion by using a single packaging material. As the polymer material to be used for such packaging, for example, a layered packaging material is known, which is obtained by layering a base material layer, such as a polyester layer, and an ionomer layer via an adhesion layer. According to the relationship between the sealing temperature and the seal strength, the layered packaging material as described above is required to exhibit a certain level of seal strength suitable for peelable sealing under a low temperature sealing condition, and to exhibit a high seal strength suitable for lock sealing under a high temperature sealing condition.

Further, in packaging materials, practically, it is necessary to stably carry out the lock sealing and the peelable sealing. Specifically, it is required for packaging materials to have a temperature region in which the peelable sealing can be satisfactorily performed, that is, a temperature region (a plateau region) in which the seal strength of a peelable seal portion does not change significantly depending on the temperature.

As a technique relating to such a sealing form, a layered film for packaging which is provided with a seal layer of a polymer composition including 60 parts by weight to 95 parts by weight of a metal salt of an ethylene-$\alpha,\beta$-unsaturated carboxylic acid-based copolymer and 40 parts by weight to 5 parts by weight of an ethylene-$\alpha,\beta$-unsaturated carboxylic acid ester copolymer has been disclosed (see, for example, JP-B No. 5-11549). It is said that the layered film for packaging exhibits a relatively low and constant seal strength in a wide temperature range (namely, a plateau region is exhibited), and also exhibits a high seal strength under a high temperature sealing condition.

Further, a blend of a propylene copolymer and an ionomer having 5% by weight to 25% by weight of a unit derived from isobutyl acrylate, in addition to a unit derived from ethylene and a unit derived from an acid, has been disclosed (see, for example, JP-B No. 1-49382).

Furthermore, as a resin composition by which a high seal strength is obtained in a high temperature region at the time of lock sealing (for example, 20 N/15 mm or more at 180° C. or higher) and, at the time of peelable sealing, a seal strength being equal to or higher than heretofore is stably obtained, while suppressing the dependence on temperature, in a wide temperature region (namely, a plateau region is exhibited), a resin composition containing (A) an ionomer that includes an ethylene-$\alpha,\beta$-unsaturated carboxylic acid copolymer and a ternary polymer of ethylene-$\alpha,\beta$-unsaturated carboxylic acid-$\alpha,\beta$-unsaturated carboxylic acid ester and (B) a propylene-based polymer, in which the mass of a structural unit derived from the $\alpha,\beta$-unsaturated carboxylic acid ester is from 1% by mass to 4.5% by mass of a total mass of the (A) ionomer, is known (see, for example, International Publication WO 2009/145235).

Moreover, a resin composition which exhibits a relatively low seal initiation temperature, realizes a little amount of electrostatic charge accumulation, and exhibits both lock seal performance and peelable seal performance is also known (see, for example, Japanese National Phase Publication No. 2008-500450).

DISCLOSURE OF INVENTION

Problems to be Solved by the Invention

Incidentally, in the production of films by using a resin composition, usually, films are produced by extruding the resin composition by means of a processing machine such as a T-die extruder or an inflation extruder. In this process, the direction in which the extruded film flows out from the processing machine is referred to as the "machine direction (MD)", and the direction that intersects the MD at right angles is referred to as the "transverse direction (TD)".

When the above conventional resin composition is extruded to produce a film, followed by heat sealing of the obtained film, although it depends on the relationship between the MD and the TD, and the sealing direction or the peeling direction, there are cases in which the intended peelable seal strength is not exhibited until approximately 12 hours have passed since heat sealing, and the intended peelable seal strength is finally exhibited after several days (that is, from 1 day to 3 days) have passed since heat sealing.

The present invention has been made in view of the above-described circumstances. Under the above-described circumstances, a resin composition, a heat seal film, and a layered film that exhibit a stable peelable seal strength and lock seal strength from immediately after heat sealing have been demanded.

Means for Solving the Problems

Specific means for achieving the objects described above are as follows.

<1> A resin composition including:

(1) at least one selected from the group consisting of ethylene-α,β-unsaturated carboxylic acid copolymers and ionomers thereof, which have a melt flow rate (at 190° C., under a load of 2160 g; JIS K 7210) of from 0.5 g/10 min to 6 g/10 min, (2) at least one selected from the group consisting of ethylene-α,β-unsaturated carboxylic acid copolymers and ionomers thereof, which have a melt flow rate (at 190° C., under a load of 2160 g; JIS K 7210) of from 10 g/10 min to 30 g/10 min, and (3) at least one selected from the group consisting of propylene homopolymers and copolymers obtained by copolymerization using propylene and one or more α-olefins excluding propylene, in which a structural unit derived from an α,β-unsaturated carboxylic acid ester is substantially not contained in the total amount of the ethylene-α,β-unsaturated carboxylic acid copolymers and the ionomers thereof.

<2> The resin composition according to <1>, wherein the content of the structural unit derived from an α,β-unsaturated carboxylic acid ester in the total amount of the ethylene-α,β-unsaturated carboxylic acid copolymers and the ionomers thereof is less than 1% by mass.

<3> The resin composition according to <1> or <2>, wherein the content of the structural unit derived from an α,β-unsaturated carboxylic acid ester in the total amount of the ethylene-α,β-unsaturated carboxylic acid copolymers and the ionomers thereof is 0.5% by mass or less.

<4> The resin composition according to any one of <1> to <3>, wherein
the content of (1) is from 30% by mass to 60% by mass,
the content of (2) is from 30% by mass to 60% by mass, and
the content of (3) is from 5% by mass to 15% by mass, based on 100% by mass of a total amount of (1), (2), and (3).

<5> The resin composition according to any one of <1> to <4>, wherein (1) and (2) each contain a structural unit derived from ethylene and a structural unit derived from acrylic acid or methacrylic acid.

<6> The resin composition according to any one of <1> to <5>, wherein the melt flow rate (at 230° C., under a load of 2160 g; JIS K 7210) of (3) is from 5 g/10 min to 20 g/10 min.

<7> The resin composition according to any one of <1> to <6>, which is to be used for extrusion.

<8> The resin composition according to any one of <1> to <7>, which is to be used for extrusion in accordance with the inflation method.

<9> A heat seal film obtained by extrusion of the resin composition according to any one of <1> to <8>.

<10> The heat seal film according to <9>, which is obtained by extrusion of the resin composition according to any one of <1> to <8> in accordance with the inflation method.

<11> A layered film having the heat seal film according to <9> or <10> on a base material film.

Effects of the Invention

According to the present invention, a resin composition, a heat seal film, and a layered film that exhibit a stable peelable seal strength and lock seal strength from immediately after heat sealing can be provided.

EMBODIMENTS FOR CARRYING OUT INVENTION

Figure 1:
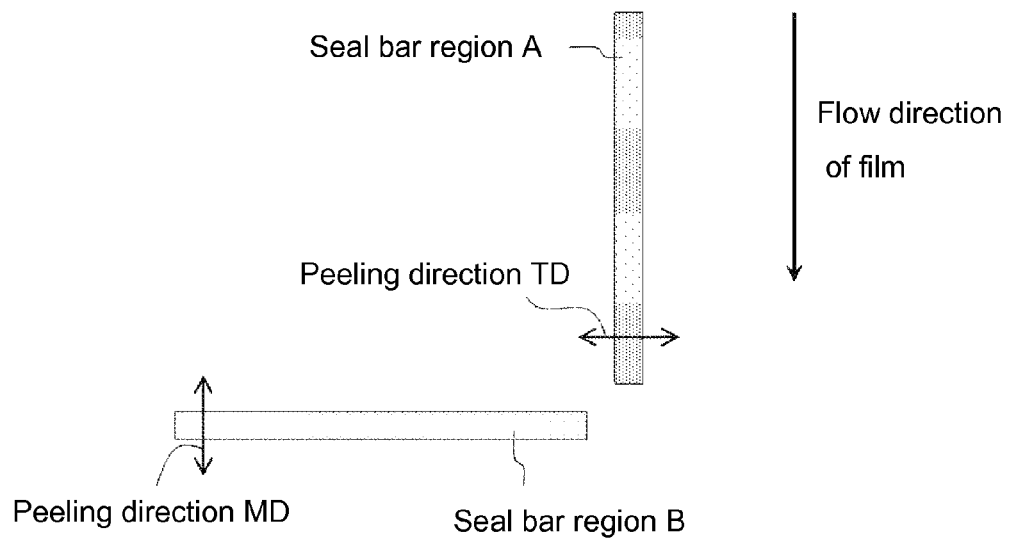
FIG. 1 is a schematic view showing the flow direction of a film, the seal bar region A, the seal bar region B, the peeling direction MD, and the peeling direction TD, in the Examples.

Hereinafter, the resin composition of the present invention is described in detail.

The resin composition of the present invention is a resin composition including (1) at least one selected from the group consisting of ethylene-α,β-unsaturated carboxylic acid copolymers and ionomers thereof, which have a melt flow rate (at 190° C., under a load of 2160 g; JIS K 7210) of from 0.5 g/10 min to 6 g/10 min (hereinafter, may also be referred to simply as "component (1)"), (2) at least one selected from the group consisting of ethylene-α,β-unsaturated carboxylic acid copolymers and ionomers a thereof, which have a melt flow rate (at 190° C., under a load of 2160 g; JIS K 7210) of from 10 g/10 min to 30 g/10 min (hereinafter, may also be referred to simply as "component (2)"), and (3) at least one selected from the group consisting of propylene homopolymers and copolymers obtained by copolymerization using propylene and one or more α-olefins excluding propylene (hereinafter, may also be referred to simply as "component (3)"), in which a structural unit derived from an α,β-unsaturated carboxylic acid ester is substantially not contained in the total amount of the ethylene-α,β-unsaturated carboxylic acid copolymers and the ionomers thereof.

In this specification, the melt flow rate (at 190° C., under a load of 2160 g; JIS K 7210) of from 0.5 g/10 min to 6 g/10 min may be referred to as "low MFR", and the above component (1) may be referred to as the "low MFR component".

Further, in this specification, the melt flow rate (at 190° C., under a load of 2160 g; JIS K 7210) of from 10 g/10 min to 30 g/10 min may be referred to as "high MFR", and the above component (2) may be referred to as the "high MFR component".

Further, in this specification, the direction of peeling when peeling is carried out in the direction parallel to the transverse direction (TD) may be referred to as the "peeling direction TD", and the direction of peeling when peeling is carried out in the direction parallel to the machine direction (MD) may be referred to as the "peeling direction MD".

Further, in this specification, the seal strength suitable for peelable sealing (for example, a seal strength of from 5 N/15 mm to 10 N/15 mm) may be referred to as the "peelable seal strength", and the seal strength suitable for lock sealing (for example, a seal strength of 20 N/15 mm or more) may be referred to as the "lock seal strength".

Furthermore, in this specification, the sealing temperature region in which peelable seal strength is obtained and in which a plateau region is formed may be referred to as the "peelable region".

In the resin composition of the present invention, by the incorporation of the above component (1), a low seal strength to a certain degree (for example, a seal strength of 10 N/15 mm or less), which is suitable for peelable sealing, may be obtained under a low temperature sealing condition (for example, 160° C. or lower. The same shall apply hereinafter.).

Further, in the resin composition of the present invention, by the incorporation of the above component (2), a high seal strength (for example, a seal strength of 20 N/15 mm or more) suitable for lock sealing may be obtained under a high temperature sealing condition (for example, 180° C. or higher. The same shall apply hereinafter.), and at the same time, also under a low temperature sealing condition, a high seal strength to a certain degree (for example, a seal strength of 5 N/15 mm or more), which is suitable for peelable sealing, may be obtained.

Accordingly, in the resin composition of the present invention, by the incorporation of the above component (1) and the above component (2), a seal strength (for example, a seal strength of from 5 N/15 mm to 10 N/15 mm) suitable for peelable sealing may be obtained under a low temperature sealing condition, and at the same time, a seal strength (for example, a seal strength of 20 N/15 mm or more) suitable for lock sealing may be obtained under a high temperature sealing condition.

Further, in the resin composition of the present invention, by the incorporation of the above component (3), the temperature range of the peelable region (plateau region) may become wider.

Furthermore, in the resin composition of the present invention, since a structural unit derived from an α,β-unsaturated carboxylic acid ester is substantially not contained in the total amount of the ethylene-α,β-unsaturated carboxylic acid copolymers and the ionomers thereof, a seal strength (for example, a seal strength of from 5 N/15 mm to 10 N/15 mm) suitable for peelable sealing (particularly, on the seal strength in the peeling direction TD) may be obtained from immediately after heat sealing, under a low temperature sealing condition.

For the reasons described above, the resin composition of the present invention can exhibit stable lock-and-peel performance (lock seal performance and peelable seal performance) from immediately after heat sealing.

Further, according to the present invention, under the low temperature sealing condition, it is possible to minimize the difference between the seal strength in the peeling direction TD and the seal strength in the peeling direction MD. Therefore, the resin composition of the present invention can deal with various sealing forms or various seal packaging machines, irrespective of the directionality of the packaging material.

Furthermore, according to the present invention, the temperature range of the peelable region (plateau region) can be widened. Namely, under the low temperature sealing condition, the dependency of seal strength on the sealing temperature can be minimized. Thus, by the use of the resin composition of the present invention, peelable seals can be stably produced.

In the resin composition of the present invention, a structural unit derived from an α,β-unsaturated carboxylic acid ester is substantially not contained in the total amount (the whole quantity) of the ethylene-α,β-unsaturated carboxylic acid copolymers and the ionomers thereof, which are contained in the resin composition.

Here, the expression "is substantially not contained" means that the ethylene-α,β-unsaturated carboxylic acid copolymers and the ionomers thereof, which are contained in the resin composition of the present invention, do not positively contain a structural unit derived from an α,β-unsaturated carboxylic acid ester. Namely, a structural unit derived from an α,β-unsaturated carboxylic acid ester may exist in a small amount, to the extent of not impairing the purpose of the present invention.

More specifically, the expression "is substantially not contained" indicates that the content of a structural unit derived from an α,β-unsaturated carboxylic acid ester in the total amount of the ethylene-α,β-unsaturated carboxylic acid copolymers and the ionomers thereof is 2% by mass or less.

When the content of a structural unit derived from an α,β-unsaturated carboxylic acid ester in the total amount of the ethylene-α,β-unsaturated carboxylic acid copolymers and the ionomers thereof exceeds 2% by mass, there is concern that a seal strength suitable for peelable sealing cannot be obtained immediately after heat sealing under the low temperature sealing condition (for example, under the low temperature sealing condition, the seal strength immediately after heat sealing becomes too high). In addition, when the content exceeds 2% by mass, there is concern about the occurrence of tight winding of a film after being taken-up, the occurrence of blocking between films, or the occurrence of lowering of mouth-opening property when a tubular film is formed. The tight winding and blocking may extremely deteriorate the secondary processability (productivity of final packaging bodies) when using a converter that manufactures packaging bodies and may cause an increase in incidence of off-specification products. The lowering of mouth-opening property leads to an extreme decrease in productivity when the resin composition of the present is formed by the inflation method.

Here, the α,β-unsaturated carboxylic acid ester is not particularly limited, but examples thereof include esters of an alkyl having 4 or more carbon atoms such as isobutyl or n-butyl, which are described below.

In the resin composition of the present invention, the content of the structural unit derived from an α,β-unsaturated carboxylic acid ester in the total amount of the ethylene-α,β-unsaturated carboxylic acid copolymers and the ionomers thereof is preferably 1.5% by mass or less, more preferably 1% by mass or less, more preferably less than 1% by mass, even more preferably 0.5% by mass or less, and particularly preferably 0.1% by mass or less. The content is most preferably 0% by mass (namely, the structural unit derived from an α,β-unsaturated carboxylic acid ester is not contained at all in the total amount of the ethylene-α,β-unsaturated carboxylic acid copolymers and the ionomers thereof).

Note that, in the resin composition of the present invention, within the range of the content of the structural unit derived from an α,β-unsaturated carboxylic acid ester in the total amount of the ethylene-α,β-unsaturated carboxylic acid copolymers and the ionomers thereof being 2% by mass or less, at least one of the component (1) or the component (2) may contain a structural unit derived from an α,β-unsaturated carboxylic acid ester.

Further, in the resin composition of the present invention, examples of a combination of the component (1) and the component (2) may include the following combinations.

Combination (A): a combination of a low MFR ethylene-α,β-unsaturated carboxylic acid copolymer as the component (1) and a high MFR ethylene-α,β-unsaturated carboxylic acid copolymer as the component (2)

Combination (B): a combination of a low MFR ionomer of an ethylene-α,β-unsaturated carboxylic acid copolymer as the component (1) and a high MFR ionomer of an ethylene-α,β-unsaturated carboxylic acid copolymer as the component (2)

Combination (C): a combination of a low MFR ethylene-α,β-unsaturated carboxylic acid copolymer as the component (1) and a high MFR ionomer of an ethylene-α,β-unsaturated carboxylic acid copolymer as the component (2)

Combination (D): a combination of a low MFR ionomer of an ethylene-α,β-unsaturated carboxylic acid copolymer as the component (1) and a high MFR ethylene-α,β-unsaturated carboxylic acid copolymer as the component (2)

Among the above combinations, from the viewpoint of being less likely to occur tight winding of a film, the combination (A), the combination (C), and the combination (D) are preferable, and the combination (A) is particularly preferable.

In the present invention, as the component (1), one selected from the group consisting of ethylene-α,β-unsaturated carboxylic acid copolymers and ionomers thereof, which have a melt flow rate within the range of from 0.5 g/10 min to 6 g/10 min, may be used alone, or two or more selected from the above group may be used in combination.

Further, from the viewpoint of more effectively realizing the effect of the invention, the melt flow rate of the component (1) is preferably from 0.5 g/10 min to 5 g/10 min, more preferably from 0.5 g/10 min to 4 g/10 min, and particularly preferably from 0.5 g/10 min to 3 g/10 min.

Moreover, the content of the component (1) is not particularly limited, but from the viewpoint of more effectively realizing the effect of the invention, the content of the component (1) with respect to a total amount of the component (1), the component (2), and the component (3) (namely, based on 100% by mass of a total of the component (1), the component (2), and the component (3)) is preferably from 30% by mass to 60% by mass, and more preferably from 35% by mass to 55% by mass.

In the present invention, as the component (2), one selected from the group consisting of ethylene-α,β-unsaturated carboxylic acid copolymers and ionomers thereof, which have a melt flow rate within the range of from 10 g/10 min to 30 g/10 min, may be used alone, or two or more selected from the above group may be used in combination.

Further, from the viewpoint of more effectively realizing the effect of the invention, the melt flow rate of the component (2) is preferably from 10 g/10 min to 25 g/10 min, more preferably from 11 g/10 min to 20 g/10 min, and particularly preferably from 11 g/10 min to 15 g/10 min.

By the melt flow rate of the component (2) being 10 g/10 min or more, a peelable region may be obtained at a temperature for low-temperature sealing.

By the melt flow rate of the component (2) being 30 g/10 min or less, a stable formability can be ensured during the formation of a film. For instance, in the formation of a film by the inflation method, a stable formability can be ensured without causing the above-described occurrence of blocking of films, the above-described lowering of mouth-opening property when a tubular film is formed, and the above-described lowering of secondary processability.

Moreover, the content of the component (2) is not particularly limited, but the content of the component (2) with respect to a total amount of the component (1), the component (2), and the component (3) (namely, based on 100% by mass of a total of the component (1), the component (2), and the component (3)) is preferably from 30% by mass to 60% by mass, and more preferably from 40% by mass to 60% by mass.

<Ethylene-α,β-unsaturated carboxylic acid copolymer>

The ethylene-α,β-unsaturated carboxylic acid copolymer according to the present invention is a copolymer obtained by copolymerization using, as copolymerization components, at least ethylene and a monomer selected from α,β-unsaturated carboxylic acids. The ethylene-α,β-unsaturated carboxylic acid copolymer according to the present invention may be copolymerized with a monomer other than the unsaturated carboxylic acid, as necessary.

The ethylene-α,β-unsaturated carboxylic acid copolymer is preferably a binary random copolymer of ethylene and an α,β-unsaturated carboxylic acid, from the viewpoints of enhancing the seal strength of the peelable seal portion, which has been low-temperature sealed, such that the seal strength becomes equal to or higher than heretofore, and stably obtaining the seal strength over a wide temperature region.

Examples of the α,β-unsaturated carboxylic acid include unsaturated carboxylic acids having from 4 to 8 carbon atoms and half esters, such as acrylic acid, methacrylic acid, ethacrylic acid, itaconic acid, itaconic anhydride, fumaric acid, crotonic acid, maleic acid, maleic anhydride, a maleic acid monoester (monomethyl maleate, monoethyl maleate, or the like), and a maleic anhydride monoester (monomethyl maleic anhydride, monoethyl maleic anhydride, or the like).

Among them, acrylic acid and methyacrylic acid are preferable.

Examples of the "monomer other than the α,β-unsaturated carboxylic acid", which may be copolymerized, include esters of an α,β-unsaturated carboxylic acid and an alkyl having from 1 to 8 carbon atoms, for example, methyl acrylate, ethyl acrylate, isobutyl acrylate, normal-butyl acrylate, ethyl methacrylate, isobutyl methacrylate, normal-butyl methacrylate, and the like. In addition to the above, carbon monoxide, glycidyl acrylate, glycidyl methacrylate, and the like are also copolymerizable monomers.

As a matter of course, one kind or two or more kinds of these copolymerizable monomers may be copolymerized in combination.

The polymerization ratio (mass ratio) of the structural unit derived from an α,β-unsaturated carboxylic acid in the ethylene-α,β-unsaturated carboxylic acid copolymer is preferably from 1% by mass to 25% by mass, and more preferably from 2% by mass to 20% by mass. When the copolymerization ratio of the α,β-unsaturated carboxylic acid is 1% by mass or more, it is more advantageous in terms of low-temperature sealing property.

<Ionomer of ethylene-α,β-unsaturated carboxylic acid copolymer>

The ionomer of an ethylene-α,β-unsaturated carboxylic acid copolymer according to the present invention includes the ethylene-α,β-unsaturated carboxylic acid copolymer as the base polymer, and has a structure in which carboxyl groups included in the base polymer are crosslinked by metal ions.

Examples of the base polymer include the same ethylene-α,β-unsaturated carboxylic acid copolymers as those exemplified above, and preferable embodiments thereof are also the same.

Examples of the metal ions include monovalent metal ions of lithium, sodium, potassium, cesium, or the like, divalent metal ions of magnesium, calcium, strontium, barium, copper, zinc, or the like, and trivalent metal ions of aluminum, iron, or the like. Among them, sodium and zinc are preferable in respect of an excellent sealing property of the seal portion.

The degree of neutralization of the ionomer is preferably 10% or higher.

The degree of neutralization of the ionomer is preferably from 10% to 40%. When the degree of neutralization is 10% or more, the strength of the heat seal portion can be improved, and when the degree of neutralization is 40% or less, it is advantageous in terms of the fluidity at the time of forming.

Here, the degree of neutralization indicates the proportion (%) of the carboxyl groups neutralized by metal ions, among the whole carboxyl groups contained in the ethylene-α,β-unsaturated carboxylic acid copolymer (base polymer).

Specific examples of the ethylene-α,β-unsaturated carboxylic acid copolymer or the ionomer thereof include an ethylene-acrylic acid copolymer, an ethylene-methacrylic acid copolymer, and ionomers having the above copolymer as the base polymer. As commercially available products, for example, a HIMILAN (trade name) series and a NUCREL (trade name) series, all manufactured by DuPont Mitsui Polychemicals Co., Ltd. and a SURLYN (trade name) series, manufactured by DuPont USA, and the like can be used. Further, as the ethylene-α,β-unsaturated carboxylic acid copolymer further containing a monomer other than the α,β-unsaturated carboxylic acid, which may be copolymerized, an ELVALOY (trade name) series and a BYNEL (trade name) series, all manufactured by DuPont USA, and the like can be used.

<Polypropylene (the Component (3))>

The resin composition of the present invention includes, as the component (3), at least one (hereinafter, may also referred to as "polypropylene") selected from the group consisting of propylene homopolymers and copolymers obtained by copolymerization using propylene and one or more α-olefins excluding propylene.

In the resin composition of the present invention, by the incorporation of the polypropylene, the temperature range of the low temperature sealing condition for obtaining a seal strength suitable for peelable sealing may become wider.

Examples of the polypropylene (the component (3)) may include a high crystallinity polymer selected from the group consisting of a propylene homopolymer and a copolymer obtained by copolymerization using propylene and other α-olefin other than propylene.

Examples of the polypropylene (the component (3)) include a random copolymer, a block copolymer, an alternating copolymer, and the like of propylene and ethylene and/or α-olefin (preferably, an α-olefin having from 4 to 8 carbon atoms); and a random copolymer is preferable in terms of excellent film formability and flexibility.

The melt flow rate (at 230° C., under a load of 2160 g; JIS K 7210) of the polypropylene (the component (3)) is preferably from 0.5 g/10 min to 100 g/10 min, and more preferably from 5 g/10 min to 20 g/10 min.

Further, the content of the component (3) is not particularly limited, but the content is preferably from 5% by mass to 15% by mass, and more preferably from 5% by mass to 10% by mass, with respect to a total amount of the component (1), the component (2), and the component (3) (namely, based on 100% by mass of a total of the component (1), the component (2), and the component (3)).

The resin composition of the present invention may further contain, as necessary, additives such as an antioxidant, a weather resistant stabilizer, a lubricant, or an anti-fog agent, in addition to the above components, within a range that the effects of the invention is not impaired.

Further, the resin composition of the present invention may also include other polyolefin other than the polypropylene, and by which, a balance between the peelable sealing property and the lock sealing property may be adjusted. Examples of the other polyolefin may include polyethylene such as high density polyethylene, high pressure low density polyethylene, or linear low-density polyethylene; an ethylene-α-olefin copolymer elastomer obtained by increasing the amount of the α-olefin (propylene, butene, hexene, octene, or the like) which is other than ethylene and is to be copolymerized with ethylene, to decrease the crystallinity or not to substantially exhibit crystallinity; polybutene; other olefin-based (co)polymers; and polymer blends of these polymers.

Furthermore, the resin composition of the present invention may also include a propylene-α-olefin copolymer elastomer obtained by increasing the amount of the α-olefin (ethylene, butene, hexene, octene, or the like), which is other than propylene and is to be copolymerized with propylene, to decrease the crystallinity or not to substantially exhibit crystallinity.

The preparation of the resin composition of the present invention may be carried out by dry-blending or melt-blending the components described above simultaneously or sequentially.

When preparing the resin composition by dry blending, the components are melted and plasticized and uniformly melted and mixed in a forming machine; and when preparing the resin composition by melt blending, the components are melted and mixed using various mixers such as a single screw extruder, a twin-screw extruder, or a Banbury mixer; rolls; various kneaders; or the like. In view of miscibility, melt blending is preferable. There is no particular limitation on the mixing order.

The resin composition of the present invention may be used by being applied as a seal material to various base materials such as polyester, for example, polyethylene terephthalate or the like, polyamide, polyvinylidene chloride, an ethylene-vinyl acetate copolymer saponified substance, polystyrene, polybutene, polypropylene, polyethylene, paper, an aluminum foil, or a metal-deposited film.

The resin composition of the present invention may be applied onto the base material via an adhesive agent, or may be applied directly onto the base material surface. As the adhesive agent, it is possible to select a known anchor coating agent, such as an ethylene-based resin, for example, high pressure low density polyethylene or the like, or an adhesive agent composition obtained by mixing a crosslinking agent with a single body of any one of polyester polyol or a polyester urethane polyol that has been subjected to chain elongation by using an isocyanate compound having a functionality of two or more, or a mixture thereof.

Further, when the resin composition of the present invention is used as a seal material, it is preferable to use the resin composition after forming it into a film shape or a sheet shape.

Such a film-shaped or sheet-shaped formed body may be formed, typically, by the inflation method, the casting method (which may also be referred to as the flat die method or the T-die method), extrusion, co-extrusion, lamination, or the like. Further, such a formed body may be subjected to orientation (uniaxial orientation or biaxial orientation) by various methods.

For example, a film (a heat seal film) can be obtained by extrusion of the resin composition of the present invention in accordance with the inflation method, the flat die method, or the like. In this process, the resin composition of the present invention alone may be extruded to obtain a monolayer film, or the resin composition of the present invention may be co-extruded together with other resin composition (a resin composition for an adhesive agent layer, or the like) to obtain a layered film.

In the inflation method, a resin composition is extruded through a circular die, and the resulting tube shaped film is expanded by a stream of air, to produce an inflation film.

In the flat die method, a resin composition is extruded through a flat die (T-die), and the resulting film is cooled by means of a single metal roll (chill roll) having, inside thereof, a circulating fluid, or a water bath, to produce a cast film.

In the inflation method or the flat die method, the film may also be further orientated after the instant rapid-cooling or casting of the film.

Examples of a method of applying the resin composition of the present invention onto a base material include the following methods. The following methods may be used in combination.

(1) Thermal Fusion Bonding Method

This is a method of forming the resin composition of the present invention into a film shape in advance, and placing the resulting formed body on a base material via an adhesive agent, followed by performing thermal pressure bonding. Alternatively, this is a method of layering an adhesive agent on the surface of at least one of the base material or the formed body in advance by the co-extrusion method, the extrusion and coating method, or the like, and then performing thermal pressure bonding of the base material and the formed body.

(2) Sandwich Lamination Method

This is a method of forming the resin composition of the present invention into a film shape in advance, and pasting together the resulting formed body with a base material via a molten membrane of an adhesive agent, which is formed by the T-die method or the like.

(3) Co-extrusion Method

This is a method of layering a base material resin and the resin composition of the present invention, or layering a base material resin, an adhesive agent, and the resin composition of the present invention by the co-extrusion method.

(4) Pressure Bonding/Adhesion Method Using an Adhesive Agent

This is a method of forming the resin composition of the present invention into a film shape in advance, and coating an adhesive agent on one or both of the resulting formed body and a base material, followed by performing pressure bonding and adhesion.

Note that, in order to enhance the adhesive force, the surface of the base material to be applied with the resin composition of the present invention may be subjected, for example, to a known surface treatment such as a corona discharge treatment in advance.

EXAMPLES

Hereinafter, the present invention will be described more specifically with reference to Examples; however, the invention is by no means limited to the following Examples, unless they are beyond the spirit of the invention.

Note that, the melt flow rate (MFR) was measured in accordance with JIS K 7210-1999.

Example 1

<Preparation of Resin Composition>

The respective components of the composition shown in the column, "Example 1" in Table 1 were melted and kneaded by using a single screw extruder (65 mmϕ) under the conditions of a resin temperature of 200° C. and a frequency of rotation of the screw of 30 rpm, to obtain a resin composition.

The details of the components shown in Table 1 are as follows.

Ionomer 1

A zinc ionomer [degree of neutralization of 36%, MFR (at 190° C., under a load of 2160 g) of 1.5 g/10 min] of an ethylene-methacrylic acid copolymer

[content of ethylene of 88% by mass, content of methacrylic acid of 12% by mass]

EMAA 1

An ethylene-methacrylic acid copolymer

[content of ethylene of 88% by mass, content of methacrylic acid of 12% by mass, MFR (at 190° C., under a load of 2160 g) of 13.5 g/10 min]

EMAA 2

An ethylene-methacrylic acid-isobutyl acrylate copolymer

[content of ethylene of 81% by mass, content of methacrylic acid of 11% by mass, content of isobutyl acrylate of 8% by mass, MFR (at 190° C., under a load of 2160 g) of 10.0 g/10 min]

EMAA 3

An ethylene-methacrylic acid-isobutyl acrylate copolymer

[content of ethylene of 80% by mass, content of methacrylic acid of 10% by mass, content of isobutyl acrylate of 10% by mass, MFR (at 190° C., under a load of 2160 g) of 36.0 g/10 min]

EMAA 4

An ethylene-methacrylic acid copolymer

[content of ethylene of 91% by mass, content of methacrylic acid of 9% by mass, MFR (at 190° C., under a load of 2160 g) of 1.5 g/10 min]

Polypropylene

A propylene-ethylene random copolymer

[MFR (at 230° C., under a load of 2160 g) of 8.0 g/10 min, density of 910 kg/m$^3$, trade name: PRIME POLYPRO F219DA, manufactured by Prime Polymer Co., Ltd.]

<Evaluation>

(Preparation of Inflation Film)

The material for the seal layer described below, the material for the intermediate layer described below, and the material for the base material adhesion layer described below were supplied to a 45 mmϕ 3-type 3-layer inflation forming machine and were melted and kneaded under the condition of a resin temperature of 180° C., and thereafter, by extrusion, an inflation film was formed, which had a layered structure of seal layer/intermediate layer/base material adhesion layer, and had a total thickness of 50 μm (the thickness ratio of the respective layers being 1/1/1; hereinafter, abbreviated to "inflation film (50)").

—Material for Seal Layer—

The material for the seal layer is the resin composition obtained in the "Preparation of Resin Composition" described above.

—Material for Intermediate Layer—

The material for the intermediate layer is the following EMAA 5.

EMAA 5

An ethylene-methacrylic acid copolymer [content of ethylene of 95% by mass, content of methacrylic acid of 5% by mass, MFR (at 190° C., under a load of 2160 g) of 1.5 g/10 min]

—Material for Base Material Adhesion Layer—

The material for the base material adhesion layer is the following LDPE 1.

LDPE 1: High Pressure Low Density Polyethylene [MFR (at 190° C., under a load of 2160 g) of 1.6 g/10 min, density of 920 kg/m$^3$]

(Preparation of Layered Film)

Subsequently, a layered base material of polyethylene terephthalate having a thickness of 12 μm [PET (12)]/polyethylene having a thickness of 15 μm [PE (15)] was prepared, and the inflation film (50) was placed on the PE (15) side via another PE (15) (hereinafter, may also be referred to as "PE (15) sand") and then, the resulting layered material was subjected to a sand lamination processing using a 65 mmϕ laminater (at a temperature of 315° C.), thereby obtaining a layered film having a constitution of PET (12)/PE (15)/PE (15) sand/inflation film (50) (here, the inflation film (50) was in contact with the PE (15) sand at the base material adhesion layer side).

(Heat Sealing)

Using the layered film thus obtained, the surfaces of the seal layer side of the inflation films (50) were superimposed on each other, and heat sealing was carried out using a bar sealer type (single-side heating) heat sealer, under the conditions of an actual pressure of 0.2 MPa and a sealing time of 0.5 seconds.

In this heat sealing, as shown in FIG. 1, a seal bar region A (for the measurement of seal strength (peeling direction TD)) which is in the direction parallel to the flow direction (MD) of a film, and a seal bar region B (for the measurement of seal strength (peeling direction MD)) which is in the direction (TD) that intersects the flow direction of a film at right angles were provided, respectively.

Here, the expression "the flow direction of a film" indicates the direction in which the inflation film (50) flows out at the time of forming the inflation film (50) using a 45 mmϕ 3-type 3-layer inflation forming machine.

(Measurement of Changes Over Time in Seal Strength (Peeling Direction MD))

Using a tension testing machine, the seal bar region B was peeled in the peeling direction MD (see, FIG. 1), and the peeling strength in the peeling was measured as a seal strength.

The above measurement of seal strength was performed immediately after the sealing, after 1 day from the sealing, after 3 days from the sealing, and after 7 days from the sealing, respectively, thereby measuring changes over time in the seal strength (peeling direction MD).

Note that, the expression "immediately after the sealing" indicates that the measurement of seal strength was conducted within 5 hours after the heat sealing (the same shall apply in the following description.).

Figure 2:
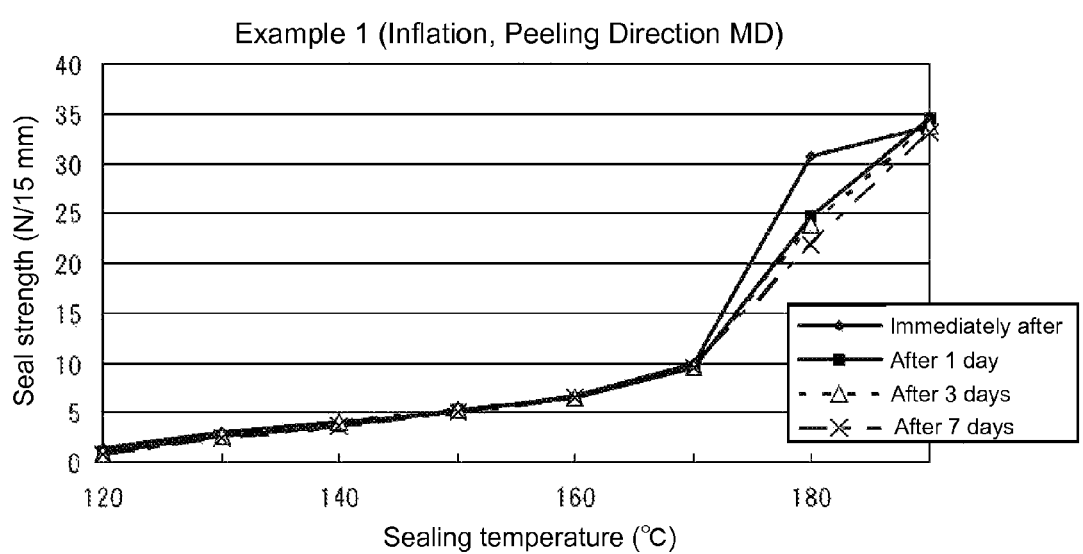
FIG. 2 is a graph showing the relationship between the sealing temperature and the seal strength, and changes over time therein, in Example 1 (peeling direction MD).

The measurement results are shown in FIG. 2.

FIG. 2 is a graph showing the relationship between the sealing temperature and the seal strength, and changes over time therein, in Example 1 (peeling direction MD).

(Measurement of Changes Over Time in Seal Strength (Peeling Direction TD))

Using a tension testing machine, the seal bar region A was peeled in the peeling direction TD (see, FIG. 1), and the peeling strength in the peeling was measured as a seal strength.

The above measurement of seal strength was performed immediately after the sealing, after 1 day from the sealing, after 3 days from the sealing, and after 7 days from the sealing, respectively, thereby measuring changes over time in the seal strength (peeling direction TD).

Figure 3:
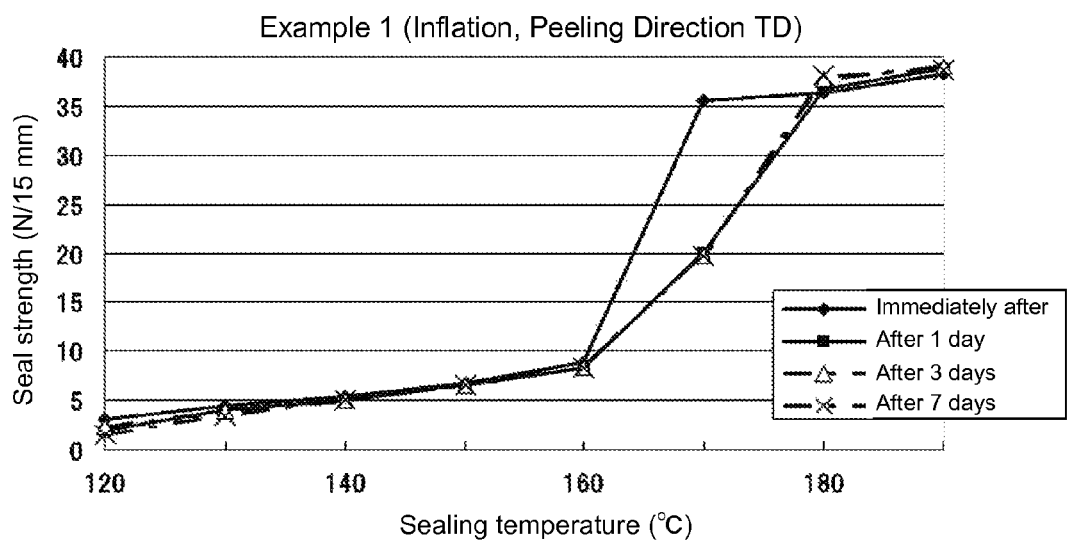
FIG. 3 is a graph showing the relationship between the sealing temperature and the seal strength, and changes over time therein, in Example 1 (peeling direction TD).

The measurement results are shown in FIG. 3.

FIG. 3 is a graph showing the relationship between the sealing temperature and the seal strength, and changes over time therein, in Example 1 (peeling direction TD).

Example 2

Preparation of a resin composition was conducted in a manner substantially similar to that in Example 1, except that the composition used for the "Preparation of Resin Composition" in Example 1 was changed as shown in Table 1 below, and evaluation was performed in a manner substantially similar to that in Example 1.

Figure 4:
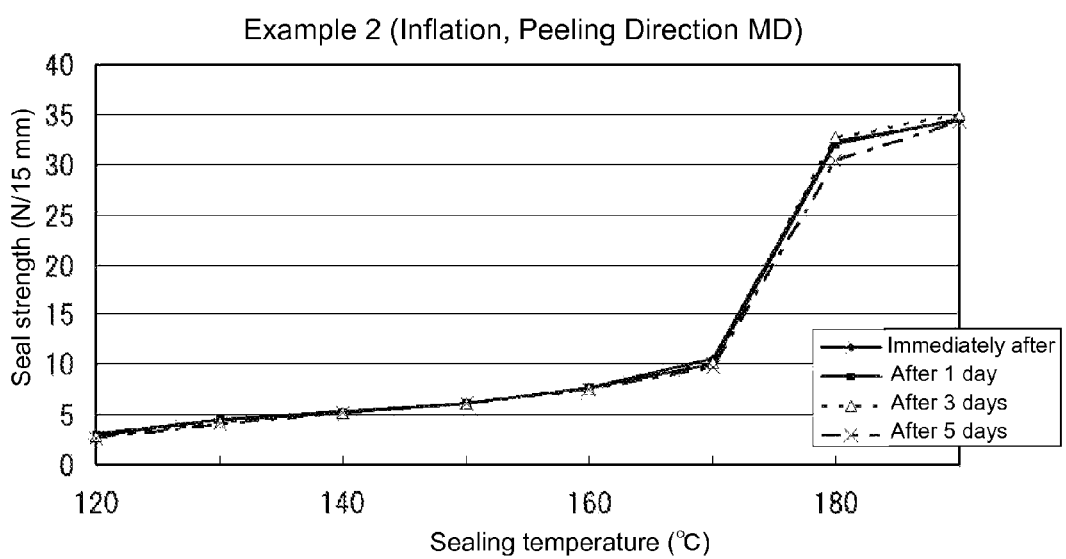
FIG. 4 is a graph showing the relationship between the sealing temperature and the seal strength, and changes over time therein, in Example 2 (peeling direction MD).
Figure 5:
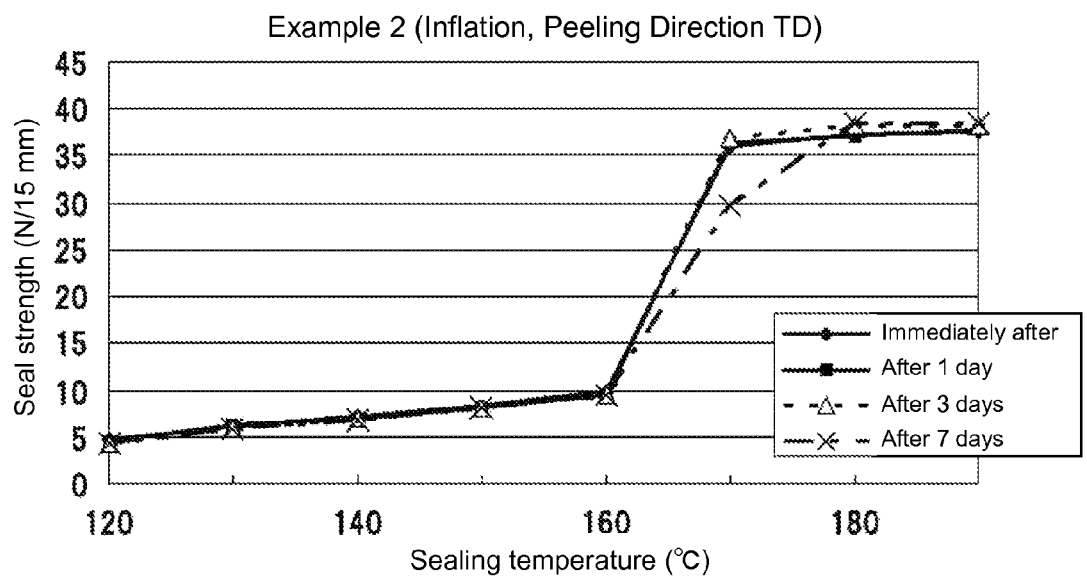
FIG. 5 is a graph showing the relationship between the sealing temperature and the seal strength, and changes over time therein, in Example 2 (peeling direction TD).

The evaluation results (measurement results) are shown in FIG. 4 and FIG. 5.

FIG. 4 is a graph showing the relationship between the sealing temperature and the seal strength, and changes over time therein, in Example 2 (peeling direction MD).

FIG. 5 is a graph showing the relationship between the sealing temperature and the seal strength, and changes over time therein, in Example 2 (peeling direction TD).

Example 3

Preparation of a resin composition was conducted in a manner substantially similar to that in Example 1, except that the composition used for the "Preparation of Resin Composition" in Example 1 was changed as shown in Table 1 below, and evaluation was performed in a manner substantially similar to that in Example 1.

However, the measurement of changes over time in the seal strength was carried out by comparing the seal strength immediately after the sealing with the seal strength after 3 days from the sealing.

Figure 6:
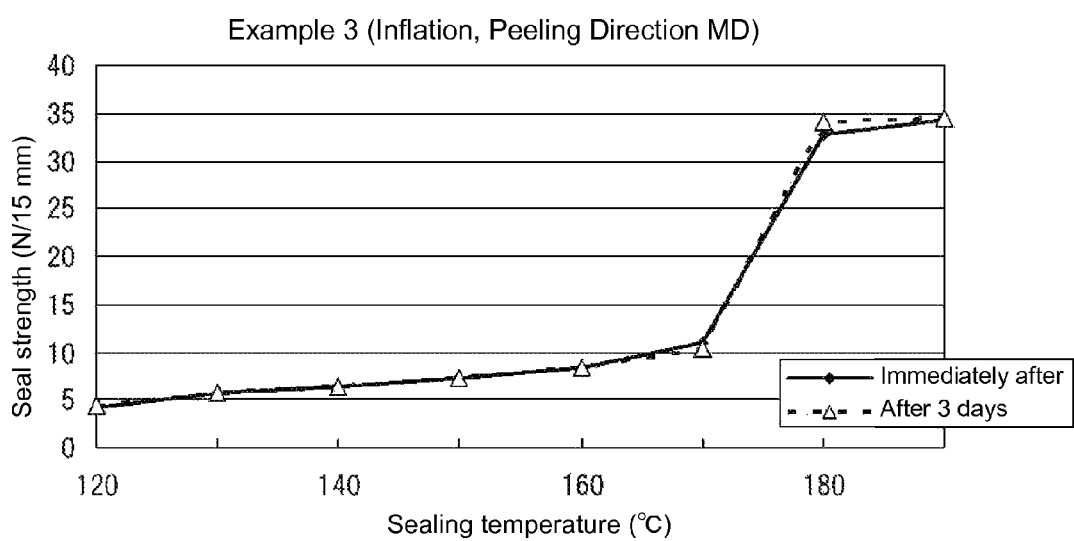
FIG. 6 is a graph showing the relationship between the sealing temperature and the seal strength, and changes over time therein, in Example 3 (peeling direction MD).
Figure 7:
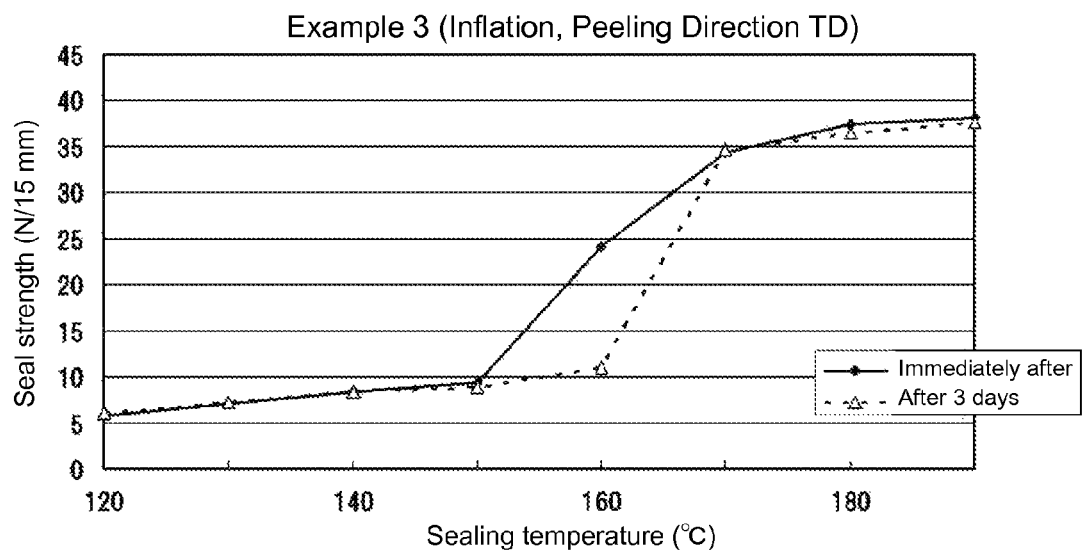
FIG. 7 is a graph showing the relationship between the sealing temperature and the seal strength, and changes over time therein, in Example 3 (peeling direction TD).

The evaluation results (measurement results) are shown in FIG. 6 and FIG. 7.

FIG. 6 is a graph showing the relationship between the sealing temperature and the seal strength, and changes over time therein, in Example 3 (peeling direction MD).

FIG. 7 is a graph showing the relationship between the sealing temperature and the seal strength, and changes over time therein, in Example 3 (peeling direction TD).

Comparative Example 1

Preparation of a resin composition was conducted in a manner substantially similar to that in Example 1, except that the composition used for the "Preparation of Resin Composition" in Example 1 was changed as shown in Table 1 below, and evaluation was performed in a manner substantially similar to that in Example 1.

Figure 8:
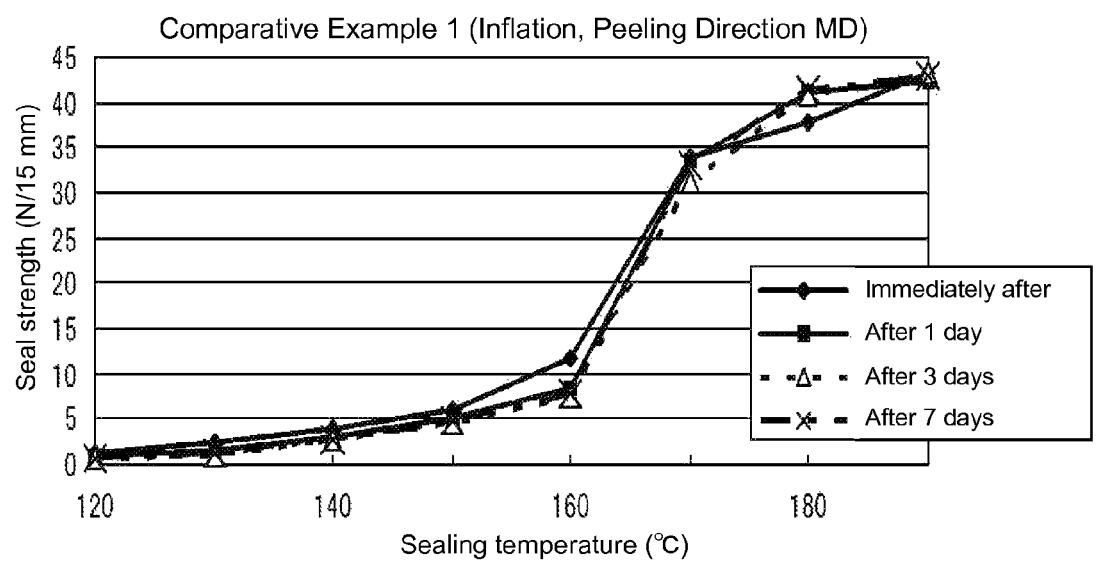
FIG. 8 is a graph showing the relationship between the sealing temperature and the seal strength, and changes over time therein, in Comparative Example 1 (peeling direction MD).
Figure 9:
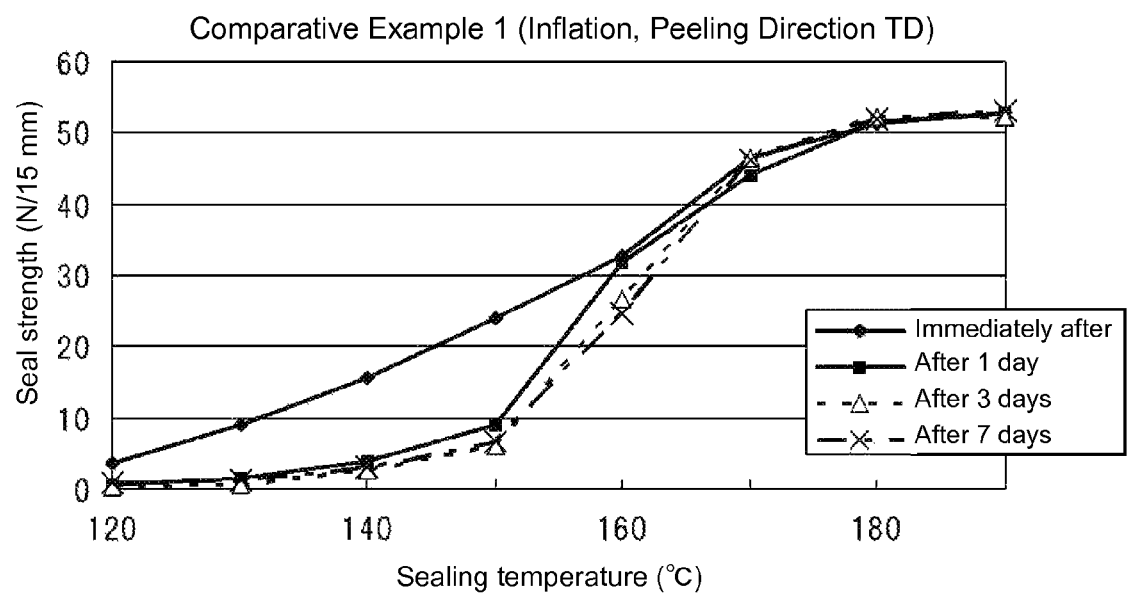
FIG. 9 is a graph showing the relationship between the sealing temperature and the seal strength, and changes over time therein, in Comparative Example 1 (peeling direction TD).

The evaluation results (measurement results) are shown in FIG. 8 and FIG. 9.

FIG. 8 is a graph showing the relationship between the sealing temperature and the seal strength, and changes over time therein, in Comparative Example 1 (peeling direction MD).

FIG. 9 is a graph showing the relationship between the sealing temperature and the seal strength, and changes over time therein, in Comparative Example 1 (peeling direction TD).

Accordingly, it was understood that, as compared with the resin composition of Comparative Example 1, the temperature range, in which a peelable seal portion can be formed, was wider in the resin compositions of Examples 1 to 3, and the resin compositions of Examples 1 to 3 could more stably prepare a peelable seal portion, and also could deal with various sealing forms or various seal packaging machines.

TABLE 1

|  | MFR (g/10 min) | MAA (% by mass) | IBA (% by mass) | Degree of Neutralization (%) | Composition of Resin Composition (% by mass) | | | |
|---|---|---|---|---|---|---|---|---|
|  |  |  |  |  | Example 1 | Example 2 | Example 3 | Comparative Example 1 |
| Ionomer 1 | 1.5 (190° C.) | 12 | — | 36 | 50 | 43 | — | 50 |
| EMAA 1 | 13.5 (190° C.) | 12 | — | — | 43 | 50 | 42 | — |
| EMAA 2 | 10 (190° C.) | 11 | 8 | — | — | — | — | 33 |
| EMAA 3 | 36 (190° C.) | 10 | 10 | — | — | — | — | 10 |
| EMAA 4 | 1.5 (190° C.) | 9 | — | — | — | — | 50 | — |
| Polypropylene | 8.0 (230° C.) | — | — | — | 7 | 7 | 8 | 7 |
| MFR of Resin Composition (g/10 min) |  |  |  |  | 4.2 | 4.8 | 4 | 3.5 |
| MAA (% by mass) in the total amount of ethylene-α,β-unsaturated carboxylic acid copolymers and the ionomers thereof |  |  |  |  | 12 | 12 | 10.4 | 11.4 |
| IBA (% by mass) in the total amount of ethylene-α,β-unsaturated carboxylic acid copolymers and the ionomers thereof |  |  |  |  | 0 | 0 | 0 | 3.9 |
| Degree of neutralization (%) in the total amount of ethylene-α,β-unsaturated carboxylic acid copolymers and the ionomers thereof |  |  |  |  | 19.4 | 16.6 | 0 | 19.4 |

In Table 1 above, the "MFR of Resin Composition (g/10 min)" is a value obtained by measurement under the condition of melt flow rate (at 190° C., under a load of 2160 g; JIS K 7210).

<Evaluation Results>

It was understood that, as shown in FIG. 2 to FIG. 7, the resin compositions of Example 1 to Example 3 exhibited stable lock-and-peel performance from immediately after sealing, in both the cases of the peeling direction MD and the peeling direction TD.

In contrast, as shown in FIG. 9, the resin composition of Comparative Example 1, which substantially contained (at a content of 3.9% by mass) a structural unit derived from IBA (an α,β-unsaturated carboxylic acid ester) in the total amount of the ethylene-α,β-unsaturated carboxylic acid copolymers and the ionomers thereof, did not become a peelable seal from immediately after sealing to 1 day after sealing, in the peeling direction TD, since the seal strength at a sealing temperature of 160° C. or lower was too strong, and did not stabilize in the peelable seal region until after 3 days had passed.

From the results described above, it was understood that the resin compositions of Example 1 to Example 3 could exhibit stable lock-and-peel performance from immediately after sealing.

In Examples 1 to 3 and Comparative Example 1, when the seal strength exceeded the vicinity of from 25 N/15 mm to 30 N/15 mm, interface peeling did not occur but destruction of the seal portion occurred.

Further, concerning the condition of the "peeling direction MD", in Examples 1 to 3 (FIG. 2, FIG. 4, and FIG. 6), the range of sealing temperatures for obtaining a seal strength suitable as the peelable seal portion (for example, a seal strength of from 5 N/15 mm to 10 N/15 mm) was significantly wider as compared with the case in Comparative Example 1 (FIG. 8).

Similarly, concerning the condition of the "peeling direction TD", in Examples 1 to 3 (FIG. 3, FIG. 5, and FIG. 7), the range of sealing temperature for obtaining a seal strength suitable as the peelable seal portion (for example, a seal strength of from 5 N/15 mm to 10 N/15 mm) was significantly wider as compared with the case in Comparative Example 1 (FIG. 9).

The entire disclosure of Japanese Patent Application No. 2010-127129 is incorporated herein into this specification by reference.

All publications, patent applications, and technical standards described in this specification are incorporated herein by reference in this specification to the same extent as if each individual publication, patent application, or technical standard was specifically and individually indicated to be incorporated by reference.

The invention claimed is:

1. A resin composition comprising:
   (1) at least one selected from the group consisting of ethylene-α,β-unsaturated carboxylic acid copolymers and ionomers thereof, which have a melt flow rate (at 190° C., under a load of 2160 g; JIS K 7210) of from 0.5 g/10 min to 6 g/10 min,
   (2) at least one selected from the group consisting of ethylene-α,β-unsaturated carboxylic acid copolymers and ionomers thereof, which have a melt flow rate (at 190° C., under a load of 2160 g; JIS K 7210) of from 10 g/10 min to 30 g/10 min, and (3) at least one selected from the group consisting of propylene homopolymers and copolymers obtained by copolymerization using propylene and one or more α-olefins excluding propylene,
   in which the content of a structural unit derived from an α,β-unsaturated carboxylic acid ester in the total amount of the ethylene-α,β-unsaturated carboxylic acid copolymers and the ionomers thereof is less than 2% by mass.

2. The resin composition according to claim 1, wherein the content of the structural unit derived from an α,β-unsaturated carboxylic acid ester in the total amount of the ethylene-α,β-unsaturated carboxylic acid copolymers and the ionomers thereof is less than 1% by mass.

3. The resin composition according to claim 1, wherein the content of the structural unit derived from an α,β-unsaturated carboxylic acid ester in the total amount of the ethylene-α,β-unsaturated carboxylic acid copolymers and the ionomers thereof is 0.5% by mass or less.

4. The resin composition according to claim 1, wherein:
   the content of (1) is from 30% by mass to 60% by mass;

the content of (2) is from 30% by mass to 60% by mass; and
the content of (3) is from 5% by mass to 15% by mass, based on 100% by mass of a total amount of (1), (2), and (3).

5. The resin composition according to claim 1, wherein (1) and (2) each comprise a structural unit derived from ethylene and a structural unit derived from acrylic acid or methacrylic acid.

6. The resin composition according to claim 1, wherein the melt flow rate (at 230° C., under a load of 2160 g; JIS K 7210) of (3) is from 5 g/10 min to 20 g/10 min.

7. The resin composition according to claim 1, which is to be used for extrusion.

8. The resin composition according to claim 1, which is to be used for extrusion in accordance with an inflation method.

9. A heat seal film obtained by extrusion of a the resin composition,
wherein the resin composition comprises:
(1) at least one selected from the group consisting of ethylene-$\alpha,\beta$-unsaturated carboxylic acid copolymers and ionomers thereof, which have a melt flow rate (at 190° C., under a load of 2160 g; JIS K 7210) of from 0.5 g/10 min to 6 g/10 min,
(2) at least one selected from the group consisting of ethylene-$\alpha,\beta$-unsaturated carboxylic acid copolymers and ionomers thereof, which have a melt flow rate (at 190° C., under a load of 2160 g; JIS K 7210) of from 10 g/10 min to 30 g/10 min, and
(3) at least one selected from the group consisting of propylene homopolymers and copolymers obtained by copolymerization using propylene and one or more $\alpha$-olefins excluding propylene,
in which the content of a structural unit derived from an $\alpha,\beta$-unsaturated carboxylic acid ester in the total amount of the ethylene-$\alpha,\beta$-unsaturated carboxylic acid copolymers and the ionomers thereof is less than 2% by mass.

10. The heat seal film according to claim 9, which is obtained by extrusion of the resin composition in accordance with an inflation method.

11. A layered film, comprising a heat seal film on a base material film,
wherein the heat seal film is obtained by extrusion of a resin composition and the resin composition comprises:
(1) at least one selected from the group consisting of ethylene-$\alpha,\beta$-unsaturated carboxylic acid copolymers and ionomers thereof, which have a melt flow rate (at 190° C., under a load of 2160 g; JIS K 7210) of from 0.5 g/10 min to 6 g/10 min,
(2) at least one selected from the group consisting of ethylene-$\alpha,\beta$-unsaturated carboxylic acid copolymers and ionomers thereof, which have a melt flow rate (at 190° C., under a load of 2160 g; JIS K 7210) of from 10 g/10 min to 30 g/10 min, and
(3) at least one selected from the group consisting of propylene homopolymers and copolymers obtained by copolymerization using propylene and one or more $\alpha$-olefins excluding propylene,
in which the content of a structural unit derived from an $\alpha,\beta$-unsaturated carboxylic acid ester in the total amount of the ethylene-$\alpha,\beta$-unsaturated carboxylic acid copolymers and the ionomers thereof is less than 2% by mass.

\* \* \* \* \*